(12) United States Patent
Berger

(10) Patent No.: US 12,539,821 B2
(45) Date of Patent: Feb. 3, 2026

(54) VEHICLE BUMPER ASSEMBLY

(71) Applicant: Marvin Berger, Lennestadt (DE)

(72) Inventor: Marvin Berger, Lennestadt (DE)

(73) Assignee: GEDIA GEBRUEDER DINGERKUS GMBH, Attendorn (DE)

( * ) Notice: Subject to any disclaimer, the term of this patent is extended or adjusted under 35 U.S.C. 154(b) by 366 days.

(21) Appl. No.: 18/224,672

(22) Filed: Jul. 21, 2023

(65) Prior Publication Data

US 2024/0092295 A1   Mar. 21, 2024

(30) Foreign Application Priority Data

Sep. 15, 2022   (DE) .......................... 102022123604.8

(51) Int. Cl.
  *B60R 19/34*   (2006.01)
  *B60R 19/02*   (2006.01)
  *B60R 19/12*   (2006.01)

(52) U.S. Cl.
  CPC ............ *B60R 19/34* (2013.01); *B60R 19/023* (2013.01); *B60R 19/12* (2013.01)

(58) Field of Classification Search
  CPC ....... B60R 19/023; B60R 19/12; B60R 19/34; B60R 19/24
  USPC ....................................................... 293/133
  See application file for complete search history.

(56) References Cited

U.S. PATENT DOCUMENTS

| | | | | |
|---|---|---|---|---|
| 5,727,827 | A * | 3/1998 | Shibuya ................. | B60R 19/24 293/155 |
| 5,803,514 | A * | 9/1998 | Shibuya ................. | B60R 19/24 293/133 |
| 8,123,265 | B2 * | 2/2012 | Nilsson ................... | B60R 19/24 293/133 |
| 9,676,353 | B2 * | 6/2017 | Sotoyama ............ | B62D 21/152 |
| 2001/0013706 | A1 * | 8/2001 | Artner ..................... | B60R 19/34 293/133 |
| 2005/0099027 | A1 * | 5/2005 | Seksaria ................. | B60R 19/34 293/133 |
| 2005/0206177 | A1 * | 9/2005 | Arns ........................ | B60R 19/34 293/155 |
| 2010/0201159 | A1 * | 8/2010 | Chretien .............. | B62D 21/155 296/193.03 |
| 2012/0086225 | A1 * | 4/2012 | Matsuura ............. | B62D 21/152 293/132 |
| 2014/0125073 | A1 * | 5/2014 | Yamada ................. | B60R 19/34 293/133 |
| 2014/0333091 | A1 * | 11/2014 | Stockard ................. | F16F 7/125 296/187.03 |
| 2015/0251613 | A1 * | 9/2015 | Mori ..................... | B62D 21/152 293/133 |
| 2015/0343973 | A1 * | 12/2015 | Stoenescu .............. | B60R 19/12 293/133 |

(Continued)

*Primary Examiner* — Gregory A Blankenship
(74) *Attorney, Agent, or Firm* — Andrew Wilford

(57) ABSTRACT

A bumper assembly for a motor vehicle has a first bumper subassembly having a first cross bar and two first U-section crash boxes spaced apart from one another and each fastened by a respective outer end to a respective one of two regions of the cross bar close to ends thereof and each fastened by a respective inner end to the structure of the vehicle, Each crash box is of U-section with a web bridging two side walls, and each crash box further has at least at the respective outer end a transversely projecting integral tab that is folded over from the web and with which the crash box is fastened to the cross bar.

10 Claims, 2 Drawing Sheets

(56) References Cited

U.S. PATENT DOCUMENTS

| | | | |
|---|---|---|---|
| 2016/0144814 A1* | 5/2016 | Ahn | B23K 31/022 |
| | | | 293/133 |
| 2017/0274849 A1* | 9/2017 | Jordan | B60R 19/24 |
| 2018/0093626 A1* | 4/2018 | Nam | F16F 7/003 |
| 2018/0170294 A1* | 6/2018 | Hashimoto | B60R 19/24 |
| 2018/0257589 A1* | 9/2018 | Kawamura | B60R 19/24 |
| 2019/0270420 A1* | 9/2019 | Kawamura | B60R 19/18 |
| 2020/0324823 A1* | 10/2020 | Kawamura | B62D 29/048 |
| 2022/0242347 A1* | 8/2022 | Berger | B60R 19/03 |
| 2024/0092295 A1* | 3/2024 | Berger | B60R 19/12 |
| 2025/0276660 A1* | 9/2025 | Yamamoto | B21J 15/02 |

* cited by examiner

VEHICLE BUMPER ASSEMBLY

FIELD OF THE INVENTION

The present invention relates to a bumper assembly. More particularly this invention concerns a bumper assembly for a vehicle such as a car or truck.

BACKGROUND OF THE INVENTION

The invention relates to a motor vehicle having at least one bumper assembly with a first bumper cross bar and at least two spaced-apart first crash boxes each secured near a respective outer end the bumper cross bar and each of which is secured at a respective inner end to portions of the vehicle structure.

Motor vehicles known in the prior art have at least one bumper assembly that usually consists of a cross bar and two crash boxes extending between the cross bar and the vehicle structure. In the event of a collision, the bumper assembly, in particular the crash boxes, absorbs or part of the energy acting on the vehicle so that damage to the vehicle structure or the vehicle occupants resulting from the collision can be reduced or even prevented.

Various crash boxes are known. For example, they can be made from one- or multi-piece tubular structures. In a multi-part design, several sheet metal parts are joined together to form a hollow section, preferably by welding two half-shells of sheet metal.

The tubular parts have open ends, with a respective outer end being welded or bolted to the cross bar or to a holder arranged on the cross bar, and the opposite inner end or a plate welded to the inner end being welded or bolted to the vehicle structure, for example a side member.

The known crash boxes have a relatively high dead weight due to their closed profile shape and their possibly multi-part design. Moisture or dirt can enter the interior of the closed hollow sections, e.g. through gaps, and lead to corrosion. To prevent corrosion, the cavity of the crash boxes can be coated with an anti-corrosion layer that is, for example paint. To allow excess paint to drip off after application, appropriate drip holes must be made in the walls of the crash boxes. If a crash box is composed of several parts, the parts must be joined together, for example by welding the parts together, which is time-consuming and may introduce undesirable weak points into the material.

OBJECTS OF THE INVENTION

It is therefore an object of the present invention to provide an improved vehicle bumper assembly.

Another object is the provision of such an improved vehicle bumper assembly that overcomes the above-given disadvantages, in particular that has a low dead weight and that can be manufactured simply and inexpensively so that in the event of an impact, the components of the bumper assembly deform in such a way that particularly low damage is caused to the vehicle structure and to the vehicle occupants. At the same time, targeted deformation of the bumper assembly is also intended to improve pedestrian protection, i.e. to reduce injuries to pedestrians in the event of a collision with the vehicle.

SUMMARY OF THE INVENTION

A bumper assembly for a motor vehicle has according to the invention a first bumper subassembly having a first cross bar and at least two first crash boxes spaced apart from one another and each fastened by a respective outer end to a respective one of two regions of the cross bar close to ends thereof and each fastened by a respective inner end to the structure of the vehicle, Each crash box is of U-section with a web bridging two side walls, and each crash box further has at least at the respective outer end a transversely projecting integral tab that is folded over from the web and with which the crash box is fastened to the cross bar.

The crash box is of a one-piece U-shape in the form of an open profile, so that time-consuming joining of several parts by welding is not necessary and the crash box has a particularly low dead weight. If the crash box is coated with an anticorrosion paint, for example, excess paint can drip off easily from the cavity that is open on one side, without the need for drainage openings or holes in one of the walls.

The integrally formed tab makes it possible to connect the crash box to the bumper cross bar in a particularly simple and cost-effective manner, as there is no need for additional components to connect the crash box to the bumper cross bar. There is also no need to attach an additional mounting for the crash boxes when manufacturing the cross bar.

The U-shaped parts open on one side can be integrated into the bumper assembly in such a way that their opening opposite the web is preferably directed downward, in the direction of the upright plane of the vehicle. In the event of an impact, the tab formed on the web that extends at least as far as the alignment line of the side walls or even beyond, is pressed against the end faces of the side walls, so that the side walls and with them the entire U-shaped box are pressed and deformed longitudinally toward the vehicle in the travel direction of the vehicle. Since the crash boxes have a lower resistance in the area of the channel opening due to the lack of wall surface in this area, the crash box is more easily deformed in this area. The crash box is compressed essentially in the vehicle-travel direction. Bending of the crash box about the vehicle's transverse axis to the side is preferably completely prevented, so that mere bending of the crash boxes is prevented and optimum energy absorption can take place. The cross bar attached to the crash boxes follows this movement.

The orientation of the channel opening thus has a significant effect on the direction of deformation of the crash boxes as well as the bumper cross bar, although the orientation can be in any other direction to adapt the bumper assembly to an appropriate range of applications.

Preferably, each U-shaped box can be provided with a transversely projecting integral tab at the inner end on the face side, which is folded over from the web and is used to fasten the crash box to the vehicle structure.

With this tab, the crash box can be attached to the vehicle structure in a simple manner, preferably bolted or welded on. There is no need for additional components with which to fasten the crash box to the vehicle structure.

It is also preferably provided that the longitudinal extent of the U-shaped boxes is parallel to the longitudinal axis of vehicle travel, with the channel opening formed by the side walls and the web being directed transversely thereto, preferably downward.

The housing of the inventive crash box extends parallel to the vehicle-travel direction and opens vertically, in particularly downward toward the ground so that neither liquid nor dirt can collect in the U-shaped box and the risk of corrosion is reduced or prevented.

It is also preferred that the U-section boxes have a substantially U-shaped or W-shaped cross-section. Such profiles have good stiffness with low dead weight and can also be manufactured at low cost.

Preferably, the ends of the first crash boxes are connected to the first cross bar and/or to the parts of the vehicle structure in an integral or friction-locked manner, preferably made by welding or bolting. The crash boxes together with the tabs are each one-piece sheet metal parts made of aluminum or steel.

In this way, crash boxes with high rigidity and low dead weight can be produced at low cost. By forming the tab, a fastening element for the crash box on the bumper cross bar and possibly also on the vehicle structure integrally with the crash box, additional holders on the cross bar and possibly fastening means for fastening the crash box to the vehicle structure are not required.

In order to guide deformation of the crash boxes in a targeted manner, the U-shaped boxes preferably have grooves in the web as a deformation aid. For the same reason, it is preferred that the edges of the side walls have a deformation trim formation, for instance notches, as a deformation aid.

Preferably, the first bumper subassembly lies on a horizontal lower load plane and a second bumper subassembly lies on an upper load plane parallel to the lower load plane. The upper load plane is thus higher than the lower load plane. This second bumper subassembly has a second bumper cross bar and two further spaced-apart second crash boxes, one end of each of which is fastened to one of the two end regions of the second bumper cross bar and the other end of which is fastened to parts of the vehicle structure.

The first crash boxes of the bumper subassembly of the lower load plane preferably open downward. In the event of an impact, the first crash boxes are preferably compressed in the vehicle-travel direction before the second crash boxes are deformed. There is preferably no or only slight movement of the crash boxes transversely of the vehicle travel direction, so bending of the crash boxes is prevented and optimum energy absorption can take place. The first cross bar attached to the first crash boxes follows this movement.

The bumper assembly of the upper load plane can have a structure known in the prior art. Alternatively, the second bumper subassembly can also be designed in the same way as the first bumper subassembly. The second bumper subassembly then also has the advantages mentioned for the first bumper subassembly. The second crash boxes are not deformed in the event of an impact until the first crash boxes have already been compressed by a certain amount in the vehicle-travel direction. This downstream deformation of the second crash boxes improves pedestrian protection in particular.

It is particularly preferred that the first crash boxes are less stiff and resistant to longitudinal crushing than the second crash boxes.

This means that in the event of an impact, the bumper assembly is first deformed in the area of the lower load plane before deformation then occurs in the area of the upper load plane.

In addition, it is particularly preferred in this case that the first bumper cross bar and the second bumper cross bar are connected to one another by connecting elements preferably arranged at the regions of the two bumper cross bars close to the ends, since this keeps the first bumper cross bar at a distance from the second bumper cross bar and allows only a certain rotational movement of the first bumper cross bar about the y-axis and prevents the first crash boxes together with the bumper cross bar from merely buckling downward.

It is also preferred that each tab at least covers the end faces of the side walls or protrudes laterally beyond the side walls, so that the tabs press against the end edges of the side walls of the crash boxes when force is applied during an impact, deforming them toward the vehicle.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
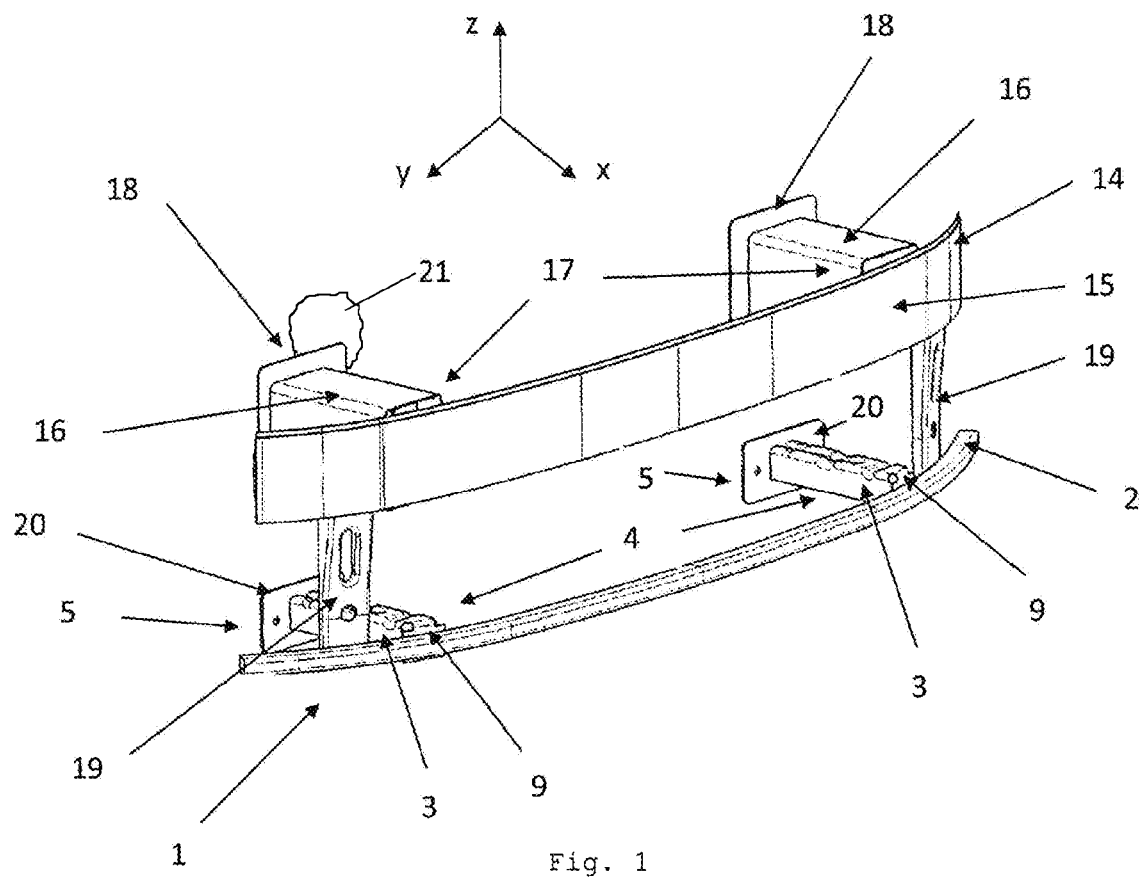
FIG. 1 is a perspective view of a bumper assembly according to the invention.

The drawing shows a first or lower bumper subassembly 1 for a motor vehicle lying in a lower load plane parallel to a horizontal x-y plane of the motor vehicle. The unillustrated horizontal vehicle axles extend parallel to the y-direction in this x-y plane. The first bumper subassembly 1 has a first cross bar 2 and two transversely (in direction y) spaced first crash boxes 3 each fastened at a respective outer end 4 to the cross bar 2 adjacent a respective outer end thereof and at a respective inner end 5 to the schematically illustrated vehicle structure 21. The outer ends 4 of the crash boxes 3 are integrally connected to the first cross bar 2. The inner ends 5 of the crash boxes 3 carry a plate 20 that is bolted or welded to the vehicle structure 21.

Figure 2:
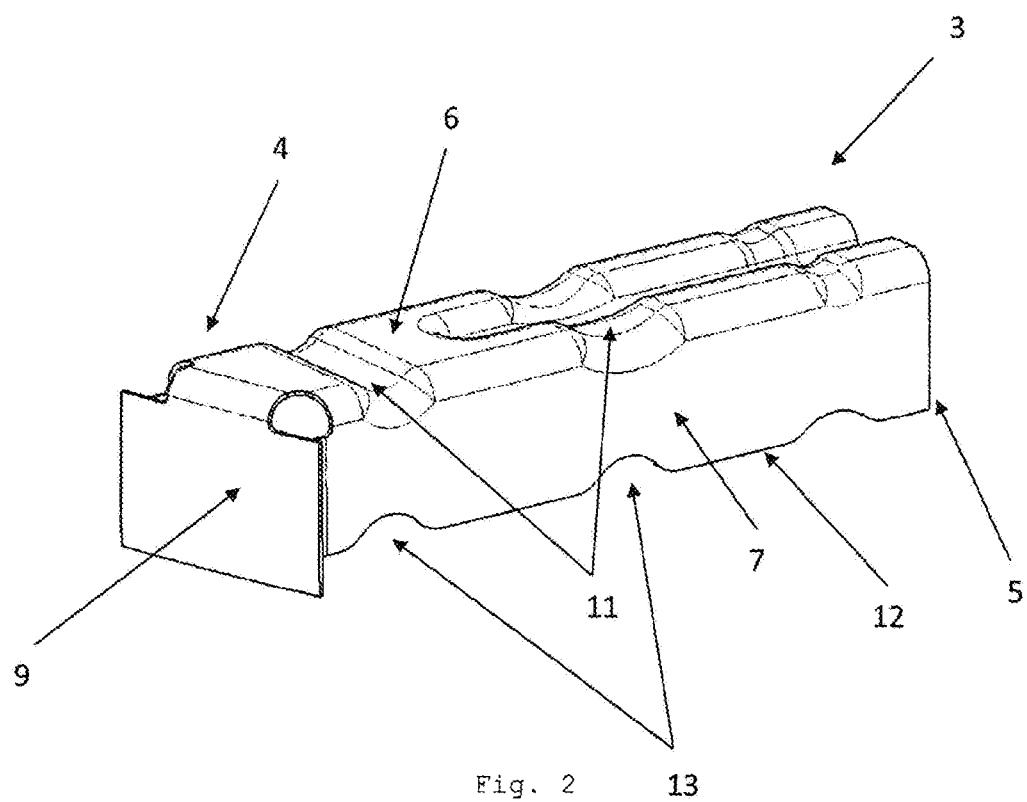
FIG. 2 is a large-scale view of a crash box of the assembly.

The first crash boxes 3 are each formed of sheet steel of U-section with an upper horizontal web or wall 6 perpendicularly bridging upper edges of two vertical side walls 7 and 8 and a transversely projecting, integral planar tab 9 bent perpendicularly down about 90° from the web 6 as shown in FIG. 2. The tab 9 of the crash box 3 is welded to the cross bar 2 (FIG. 1). The U-section crash boxes 3 are each elongated in the horizontal travel direction x and are open downward in the vertical direction z as indicated at in FIG. 3 at 10 along their full lengths so that neither liquid nor dirt can collect in them and corrosion can be reduced or even prevented.

A second or upper bumper subassembly 14 lies in an upper load plane parallel to and above the lower load plane and somewhat rearward in the vehicle travel direction x from the upright plane x-y from the lower subassembly 1. This second bumper subassembly 14 has a second or upper cross bar 15 and two further crash boxes 16 spaced horizontally apart in the horizontal transverse direction y perpendicular to the x- and z-directions. The outer end 17 of each of the crash boxes 16 is fastened to a respective end region of the second cross bar 15 and their inner ends 18 are fastened to the vehicle structure 21 like the lower crash boxes 3 of the lower subassembly 1.

The bars 2 and 14 shown in this embodiment are positioned such that the lower crash boxes 3 on the lower load plane are first crushed in the event of an impact in the longitudinal travel direction x of the vehicle before the second crash boxes 16 are deformed. Transverse bending of the first crash boxes 3 in the transverse direction y of the vehicle and mere buckling of the crash boxes in the event of a load is almost completely prevented, in particular by its U-sectional shape and the tab 9 formed on the web 6. The bumper bar 2 attached to the crash boxes 3 follows this movement. The subsequent deformation of the crash boxes 14 has a beneficial effect on pedestrian protection, for example. An alternative embodiment can be made to meet other criteria.

Figure 3:
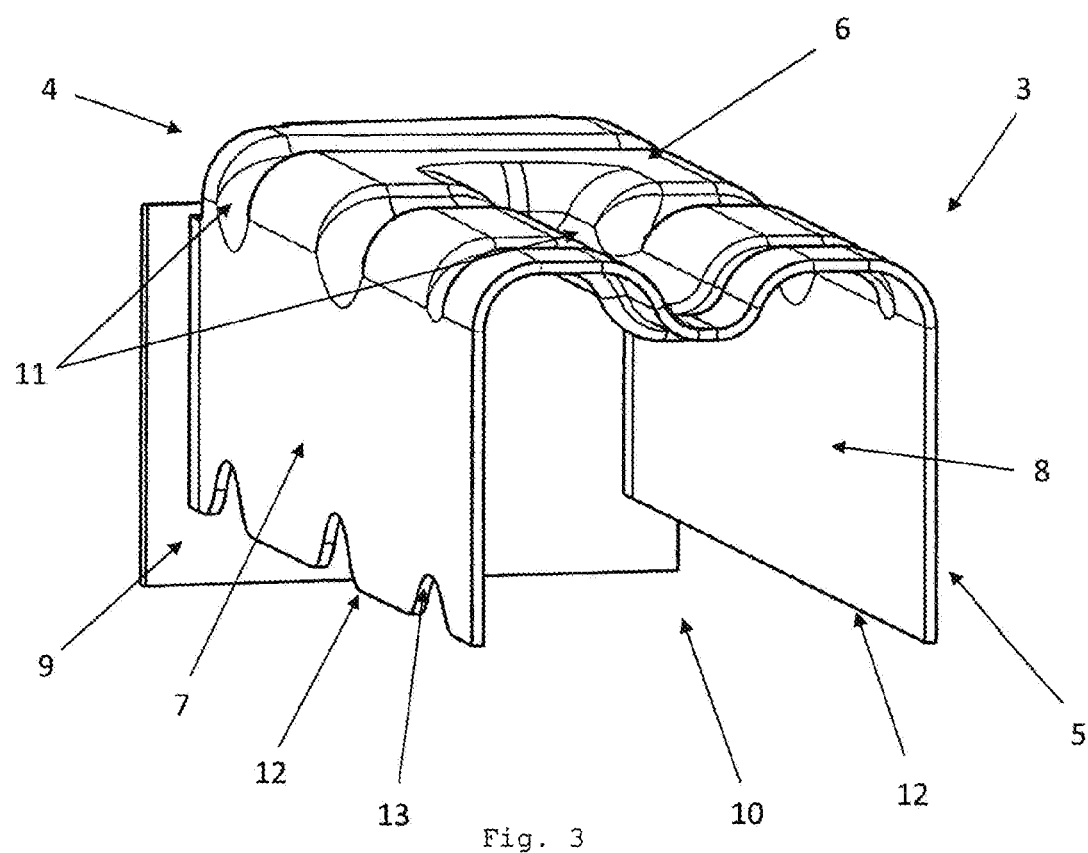
FIG. 3 is a larger-scale perspective end view of the crash box.

In this embodiment, the first crash boxes 3 open downward as shown at 10 away from the webs 6 in z-direction. The flap 9 of the first crash boxes 3, which is folded over from the web 6, projects laterally beyond the respective side walls 7 and 8 as shown in FIG. 3. In the event of an impact, the tab 9 is pressed against the end faces of the side walls 7 and 8 of U-shaped box 3, so that the side walls 7 and 8 are deformed by the applied force in the travel direction x of the vehicle. The U-shape of the boxes 3 which open downwardly at 10 and the tabs 9 formed on the webs 6 of the boxes 3 ensure the compression of the crash boxes in the vehicle travel direction x in the event of an impact and impede bending of the crash boxes 3 in the transverse direction y of the vehicle.

In addition, the lower crash boxes 3 are less stiff than the upper crash boxes 16, so that in the event of an impact, the lower bumper subassembly 1 deforms first in the lower load plane before deformation then occurs in the upper subassembly 14 in the upper load plane.

Furthermore, the first cross bar 2 and the second cross bar 15 are connected to each other by stiff vertical elements 19 spaced transversely in the y-direction and extending vertically between the cross bars 2 and 15 between their outer ends and the respective crash boxes 3 and 16. They hold the cross bars 2 and 16 at a fixed vertical spacing so that in a frontal accident lateral, downward, and upward bending of cross bar 2 is impeded.

A further advantage resulting from the U-shape of the hollow profile forming the boxes 3 and 16, compared with the crash boxes known in the prior art that have a closed tubular shape, is that material and therefore weight can be saved. The webs 6 of U-shaped boxes may be somewhat W-shaped as best shown in FIG. 3, with these webs 6 also formed as shown in FIG. 2 with crosswise deformation control grooves 11 and have good rigidity with a low dead weight and can be manufactured at low cost, typically by stamping.

The crash boxes 3 together with tabs 9 are unitary sheet-metal parts made of aluminum or steel, with the tabs 9 being formed unitarily with the web 6 so that a particularly simple and cost-effective connection of the crash box 3 to the bumper cross bar 2 can be made. When manufacturing the cross bar 2, it is not necessary to attach a holder for the crash boxes 3, as these can be fastened directly to the cross bar 2 by means of the tab 9.

To control crushing the boxes, the webs 6 are formed with transverse grooves 11. Similarly, lower edges 12 of the side walls 7 and 8 are formed with notches 13 as a deformation aid.

The invention is not limited to the embodiment example, but is variable in many ways within the scope of the disclosure. All individual and combination features disclosed in the description and/or drawing are considered essential to the invention.

I claim:

1. A bumper assembly for a motor vehicle, the assembly comprising a first bumper subassembly having
   a first cross bar and
   two first crash boxes spaced apart from one another and each fastened by a respective outer end to a respective one of two regions of the cross bar close to ends thereof and each fastened by a respective inner end to the structure of the vehicle, each crash box being of U-section with a web bridging two side walls, each crash box further having at least at the respective outer end a transversely projecting integral tab that is folded over from the web and with which the crash box is fastened to the cross bar; and a second bumper subassembly having
   a second cross bar vertically spaced from the first cross bar, and
   two second crash boxes spaced apart from one another and each fastened by a respective outer end to a respective one of two regions of the second cross bar close to ends thereof and each fastened by a respective inner end to the structure of the vehicle the first crash boxes having a lower strength with respect to crush resistance than the second crash boxes.

2. The bumper assembly according to claim 1, wherein each U-section box has at the respective inner end a transversely projecting integrally formed second tab that is folded over from the web and that is fastened to the vehicle structure.

3. The bumper assembly according to claim 1, wherein the boxes extend horizontally in a vehicle travel direction and is open transversely thereto and to a horizontal plane extending in the vehicle travel direction.

4. The bumper assembly according to claim 1, wherein the web is of W-section.

5. The bumper assembly according to claim 1, wherein the ends of the first crash boxes are integrally connected to the first cross bar and/or to the vehicle structure.

6. The bumper assembly according to claim 1, wherein the crash boxes are made of one piece of sheet aluminum or steel.

7. The bumper assembly according to claim 1, wherein the side walls or web are formed with crosswise deformation-assisting grooves.

8. The bumper assembly according to claim 1, wherein edges of the side walls have crush-control notches.

9. The bumper assembly according to claim 1, further comprising:
   vertical braces each having an upper end connected to the first bumper assembly and a lower end connected to the second bumper assembly.

10. The bumper assembly according to claim 1, wherein the tab project transversely to the respective boxes past the side walls thereof.

* * * * *